Oct. 28, 1952
J. W. CANTER
2,615,485
HANDLE FOR BUCKSAWS
Filed April 22, 1949
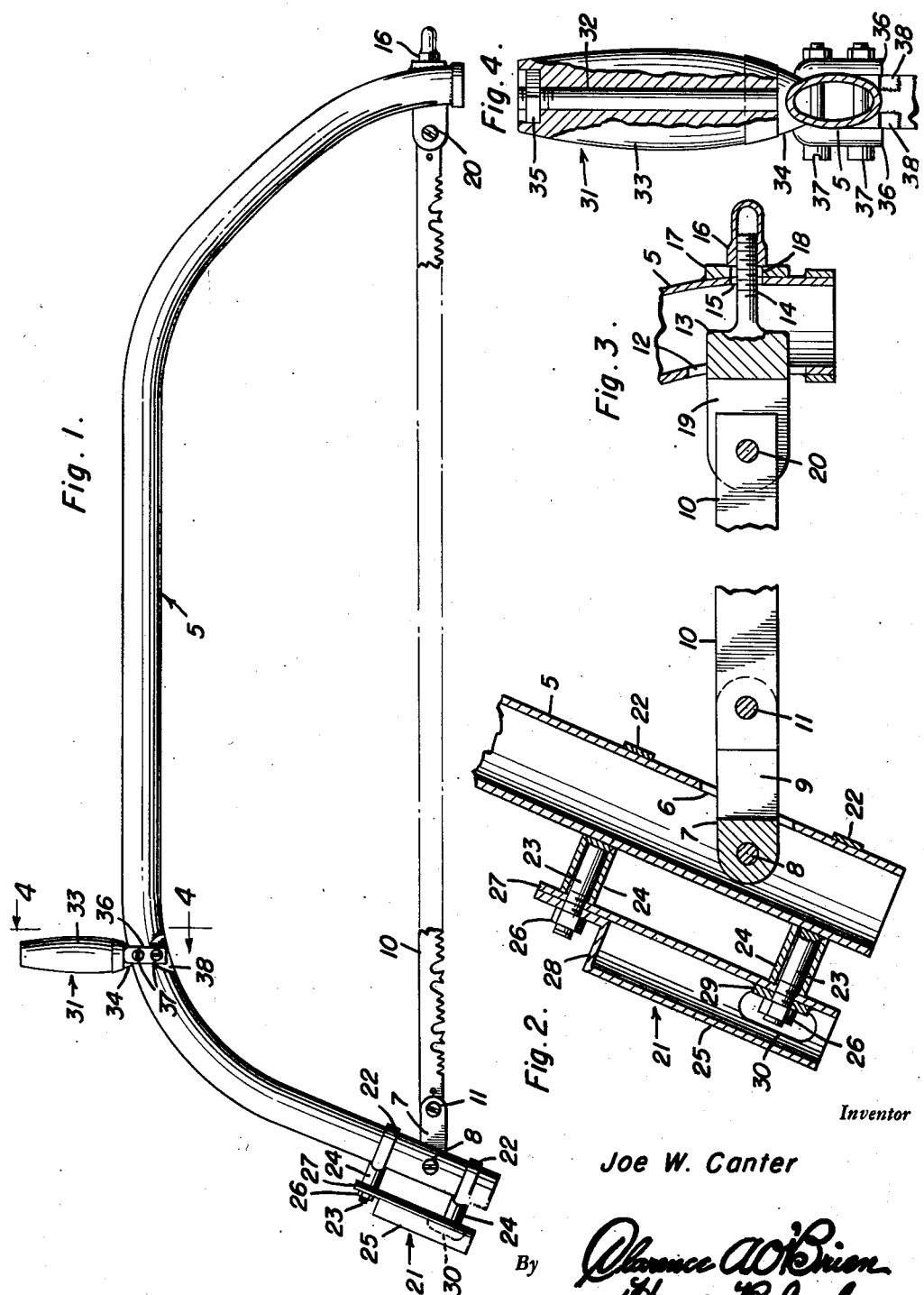
Inventor
Joe W. Canter
By Clarence A. O'Brien
and Harvey B. Jacobson
Attorneys Patented Oct. 28, 1952

2,615,485

UNITED STATES PATENT OFFICE 2,615,485

HANDLE FOR BUCKSAWS

Joe W. Canter, Wilmar, Ark.

Application April 22, 1949, Serial No. 88,971

1 Claim. (Cl. 145—108)

This invention relates to bucksaws, and an object of the invention is to provide simple and efficient means to connect the ends of the saw blade to the saw frame and to place the blade under tension.

Another object is to provide the saw frame with a novel handle which is located outside the frame in such a position that the main operating effort is exerted substantially coincident with the longitudinal axis of the saw blade.

The exact nature of the invention will become apparent from the following description when considered with the accompanying drawing, in which:

Figure 1 is a side elevational view of a bucksaw embodying the present invention.

Figure 2 is an enlarged detail view, in vertical longitudinal section, showing the main handle and the means for connecting the rear end of the saw blade to the frame.

Figure 3 is a view similar to Figure 2 taken through the forward end of the saw frame and showing the means for connecting the front end of the saw blade to the frame and for tensioning the blade.

Figure 4 is an enlarged fragmentary transverse section taken on the line 4—4 of Figure 1 and showing the auxiliary handle and the means for attaching it to the frame, the handle being partly in section.

Referring in detail to the drawing, 5 indicates the elongated saw frame made of metal tubing of oval cross-section and bent down at the ends into inverted substantially U-shape. At its rear end, the frame is provided with an elongated slot 6 through which extends a link 7 having its rear end pivotally held in the tubing by a transverse bolt 8 and provided with a longitudinal slot 9 in which the rear end of the saw blade 10 is detachably and pivotally held by a transverse bolt 11. At its forward end, the frame has an elongated slot 12 through which extends the elongated head 13 of a bolt having a threaded stem 14. Directly opposite the slot 12, the frame has an aperture 15 through which the stem 14 freely extends, and a cap nut 16 is threaded on the end of stem 14 and engages a bearing plate 17 welded on the outside of the frame and having an aperture 18 through which the stem 14 also extends. The head 13 has a longitudinal slot 19 in which the forward end of blade 10 is detachably held by a transverse bolt 20. By turning the nut 16, the blade may be tensioned or may have its tension relaxed, depending on the direction in which said nut is turned. The cap nut covers the end of stem 14 and protects the latter against mutilation of its threads.

A main handle 21 is attached to and projects rearwardly from the rear end of the frame in such a position that the operating effort is exerted on said handle substantially coincident with the longitudinal axis of the blade 10. This handle includes spaced rings 22 snugly fitted on the frame above and below the link 7 and each having a rearwardly projecting threaded stem 23, spacing sleeves 24 fitted on said stems, and a hand grip 25 secured near its ends of the rear ends of the stems 23 and against the sleeves 24 by nuts 26 threaded on said stems. The upper end portion of the hand grip 25 is cut away to provide a projecting segment 27, and an angle member 28 is welded to said hand grip so that one arm thereof closes the upper end of the tubular part of said hand grip and the other arm thereof overlies the segment 27. The upper stem 23 extends through apertures in the latter arm of member 28 and in segment 27. A bearing plate 29 for the nut 26 on the lower stem 23 is welded inside the hand grip 25 near the lower end of the latter, and said lower stem 23 extends through apertures of the hand grip 25 and the bearing plate 29. Hand grip 25 has a slot 30 in one side of its lower end portion through which access to the nut 26 on the lower stem 23 may be had for tightening said nut. The sleeves 24 butt against the frame so that tightening of nuts 26 secures the rings 22 in fixed positions on the frame in addition to securely fastening the hand grip on the stems 23. By loosening the nuts 26 and disconnecting the link 7 from the frame, the handle may be detached by sliding the rings 22 off of the frame. However, the rings 22 may be welded to the frame if a permanent handle is desired.

An auxiliary handle 31 is attached to the top of the frame near the rear end portion of the latter. As shown, this handle includes a threaded stem 32 on which is secured a tubular hand grip 33, said stem having a head 34 at its lower end against which the lower end of hand grip 33 is jambed by a nut 35 threaded on the upper end of the stem and countersunk in the upper end of said hand grip. The head 34 has spaced depending arms 36 and straddles the frame, and transverse bolts 37 extend through the arms 36 and the frame to firmly and detachably secure the handle to the latter. Bearing plates 38 for the lower ends of arms 36 are welded to the frame.

From the foregoing description, it is believed that the construction and advantages of the invention will be understood by those skilled in the art. Minor changes in details of construction are contemplated within the spirit of the invention as claimed.

Having described the invention, what is claimed as new is:

In a bucksaw having an elongated substantially U-shaped frame having a saw blade extending between the ends of said frame, a handle for the frame comprising spaced rings snugly fitted on the rear end of the frame above and below the blade and having rearwardly projecting threaded stems, spacing sleeves on said stems abutting the frame at their forward ends, a tubular hand grip having end openings receiving said stems and butting the rear ends of said sleeves, and nuts threaded on the stems for securing the hand grip thereon, at least one of the stems extending into said hand grip with the nut thereon disposed within the hand grip, said hand grip having a side slot through which access to the latter nut may be had for turning the same.

JOE W. CANTER.

REFERENCES CITED

The following references are of record in the file of this patent:

UNITED STATES PATENTS

| Number | Name | Date |
|---|---|---|
| 30,153 | Pelham | Sept. 25, 1860 |
| 299,699 | Uren | June 3, 1884 |
| 314,230 | Dean | Mar. 24, 1885 |
| 522,470 | Knowles et al. | July 3, 1894 |
| 675,333 | Joslyn | May 28, 1901 |
| 686,983 | Martin | Nov. 19, 1901 |
| 1,652,052 | Rukenbrod | Dec. 6, 1927 |
| 1,900,423 | Willey | Mar. 7, 1933 |
| 2,014,722 | Damon | Sept. 17, 1935 |
| 2,303,705 | Persson | Dec. 1, 1942 |
| 2,410,882 | Lansden | Nov. 12, 1946 |
| 2,437,296 | Forsberg | Mar. 9, 1948 |

FOREIGN PATENTS

| Number | Country | Date |
|---|---|---|
| 305,737 | Great Britain | Feb. 14, 1929 |